United States Patent [19]
Herold et al.

[11] Patent Number: 5,811,503
[45] Date of Patent: Sep. 22, 1998

[54] POLYMERIZABLE COMPOSITION

[75] Inventors: Robert D. Herold, Monroeville; Randy E. Daughenbaugh, Turtle Creek; Charles R. Wiedrich, Murrysville, all of Pa.

[73] Assignee: PPG Industries, Inc., Pittsburgh, Pa.

[21] Appl. No.: 758,620

[22] Filed: Nov. 27, 1996

[51] Int. Cl.$^6$ ..................................................... G03C 1/73
[52] U.S. Cl. ........................ 526/323.2; 252/586; 252/589; 430/345; 430/495.1; 430/962; 526/313; 526/320; 526/321; 526/323.1; 526/325; 526/326
[58] Field of Search ............................. 526/323.1, 323.2, 526/313, 320, 321, 325

[56] References Cited

U.S. PATENT DOCUMENTS

| | | | |
|---|---|---|---|
| 4,351,922 | 9/1982 | Yoshida | 525/116 |
| 5,171,806 | 12/1992 | Kayanoki | 526/262 |
| 5,266,447 | 11/1993 | Takahashi | 430/345 |
| 5,298,190 | 3/1994 | Mone | 252/301.26 |
| 5,556,931 | 9/1996 | Imura | 526/323.1 |

FOREIGN PATENT DOCUMENTS

WO96/340245   10/1996   WIPO.

Primary Examiner—Fred Zitomer
Attorney, Agent, or Firm—Irwin M. Stein; James R. Franks

[57] ABSTRACT

Describes polymerizable organic compositions of from about 30 to 95 weight percent of a first monomer component which is an alkoxylated diol, e.g., alkoxylated bisphenol, having acrylate or methacrylate groups, i.e., dimethacrylate of bisphenol A having an average of 1 to 4 ethoxy units, and from about 5 to 70 weight percent of a second monomer component which is an alkoxylated diol, e.g., alkoxylated bisphenol, having acrylate or methacrylate groups, i.e., dimethacrylate of bisphenol A having 25 to 70 ethoxy units. Optionally there may also be present from about 0 to 65 weight percent of at least one monomer component which is selected from: (i) a monoethylenically unsaturated monomer that is polymerizable by free radical initiation; (ii) a bis[(meth)acryloyl-terminated]polyethylene glycol monomer; and (iii) a monomer having at least three terminal ethylenically-unsaturated groups. Substantially completely cured polymerizates prepared from such compositions may be used to prepare photochromic articles, e.g., lenses, by incorporating a photochromic substance, e.g., by thermal transfer, into the polymerizate.

19 Claims, No Drawings

POLYMERIZABLE COMPOSITION

DESCRIPTION OF THE INVENTION

The present invention relates to polymerizable organic compositions, polymerizates from such compositions, and articles prepared from such polymerizates, particularly articles having organic photochromic substances applied to or incorporated therein. More particularly, the present invention relates to certain polymerizable organic compositions that contain a first monomer component which is an alkoxylated diol, e.g., alkoxylated bisphenol, having acrylate or methacrylate groups, i.e., dimethacrylate of bisphenol A having an average of 1 to 4, e.g., 2, ethoxy units, a second monomer component which is an alkoxylated diol, e.g., alkoxylated bisphenol, having acrylate or methacrylate groups, i.e., dimethacrylate of bisphenol A having 25 to 70, e.g. 30, ethoxy units. Optionally at least one monomer component selected from the following group, may also be present: a monomer having a single ethylenically unsaturated group which is polymerizable by free radical initiation; a bis[(meth)acryloyl-terminated]polyethylene glycol monomer; a monomer having at least three terminal ethylenically-unsaturated groups; and mixtures of these monomers. As used herein the term (meth)acryloyl is meant to include both acryloyl and methacryloyl. Photochromic articles prepared in accordance with the present invention have been observed to exhibit an improved photochromic response.

Polymerizable organic compositions based on ethoxylated bisphenol A dimethacrylate having an average of 1 to 4 ethoxy units, and polymerizates obtained therefrom are known in the art. Polymerizates of polymerizable organic compositions based on homopolymers of ethoxylated bisphenol A dimethacrylate monomer having an average of 1 to 4 ethoxy units, possess good clarity, and hardness but poor flexibility and abrasion resistance. Further, when cured substantially completely, it is difficult to incorporate organic photochromic substances into such polymerizates by diffusion.

Photochromism is a phenomenon involving a change in color of a photochromic substance, or an article containing such a substance, upon exposure to light radiation containing ultraviolet rays, such as ultraviolet radiation contained in sunlight or in the light of a mercury lamp, and a reversion to the original color when the influence of the ultraviolet radiation is discontinued. Discontinuation of the ultraviolet radiation can be achieved for example by storing the photochromic substance or article in the dark or by removing the source of ultraviolet radiation. Recently, photochromic plastic materials, particularly plastic materials for optical applications, have been the subject of considerable attention. In particular, photochromic ophthalmic plastic lenses have been investigated in part due to the weight advantage that they can offer relative to ophthalmic lenses made of glass. In addition, photochromic transparencies for vehicles, such as automobiles and airplanes, have been of interest because of the potential safety features that such transparencies offer.

U.S. Pat. No. 5,556,931 discloses polymerizable compositions comprising 100 parts of at least two ethoxylated bisphenol A dimethacrylate type monomers. The composition is described as having 30 to 80 mole % of a monomer having 2 to 3 ethoxy units, 20 to 50 mole % of a monomer having 6 to 12 ethoxy units, and less than 20 mole % of a monomer having other than 2 to 3 and 6 to 12 ethoxy units. The polymerizable compositions described in U.S. Pat. No. 5,556,931 may also include from 0 to 25 parts of a separate mono or di(meth)acrylate. International patent publication WO 91/16364 discloses a photocurable resin containing 50% to 90% by weight of an ethoxylated bisphenol A dimethacrylate type monomer having 0 to 4 ethoxy units, and 3% to 50% by weight of an ethoxylated bisphenol A dimethacrylate type monomer having 5 to 12 ethoxy units.

U.S. Pat. No. 5,545,828 discloses organic ophthalmic lenses prepared from the polymerization of a composition comprising at least 50% by weight of an ethoxylated bisphenol A dimethacrylate type monomer having 0 to 10 ethoxy units. U.S. Pat. No. 5,442,022 discloses a polymerizate obtained by the polymerization of a polymerisable composition comprising, in part, at least 50% by weight of an ethoxylated bisphenol A dimethacrylate type monomer, or mixture of such monomers, having 0 to 10 ethoxy units. U.S. Pat. No. 4,306,780 discloses a high refractive index lens obtained by copolymerization of an ethoxylated bisphenol A dimethacrylate type monomer having 0 to 8 ethoxy units. Example 14 of U.S. Pat. No. 4,306,780 discloses the combination of bisphenol A dimethacrylate (BPDMA) with phenylmethacrylate and CR-39® diethylene glycol bis(allyl carbonate) monomer.

International patent publication WO 96/19741 discloses organic photochromic materials consisting of a polymer matrix of optical quality and of at least one dye that imparts photochromic properties to the matrix. The polymer constituting the matrix may be a copolymer of 30 to 95 weight % ethoxylated bisphenol A dimethacrylate having 2 to 4 ethoxy units, and 5 to 70 weight % of a polyurethane oligomer having terminal di- or triacrylic or di- or trimethacrylic functionality. International patent publication WO 96/18926 discloses photochromic transparent organic materials particularly useful for the production of photochromic organic ophthalmic lenses. The organic materials are chosen from homopolymers of ethoxylated bisphenol A dimethacrylate having 2 to 4 ethoxy units, and copolymers of such dimethacrylates, and at most 30 weight % of an aromatic monomer with vinyl, acrylic or methacrylic functionality.

The above patents and patent applications do not disclose polymerizable organic compositions consisting essentially of from 30% to 95% by weight, based on the total weight of monomer components, of a first monomer component which is an alkoxylated bisphenol type monomer having an average of 1 to 4 ethoxy units in combination with from 5% to 70% by weight, based on the total weight of monomer components, of a second monomer component which is an alkoxylated bisphenol type monomer having 25 to 70 ethoxy units.

It has now been discovered that substantially completely cured polymerizates prepared from polymerizable organic compositions of the present invention show improved physical properties, such as flexibility and abrasion resistance, compared to polymerizates prepared from homopolymers of ethoxylated bisphenol A dimethacrylate monomers having an average of 1 to 4 ethoxy units. It has further been discovered that photochromic articles, prepared from polymerizates made in accordance with the present invention have an improved photochromic response compared to photochromic articles prepared from homopolymers of ethoxylated bisphenol A dimethacrylate monomers having an average of 1 to 4 ethoxy units.

Polymerizable organic compositions according to the present invention consist essentially of: from 30% to 95% by weight, based on the total weight of monomer components, of a first monomer component which is represented by the following general formula I,

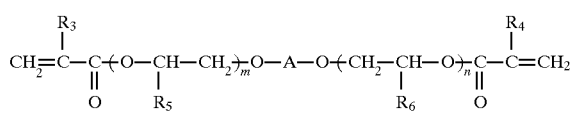

(I)

wherein m and n are each a positive number, the sum of m and n being from 1 to 4, e.g., 2, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene (usually containing from 1 to 8 carbon atoms), phenylene, $C_1$–$C_9$ alkyl substituted phenylene, and a group represented by the following general formula II,

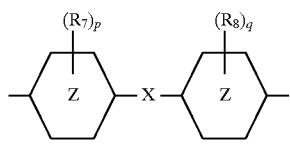

(II)

wherein $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —CH=CH—, —C($CH_3$)$_2$—, —C($CH_3$) ($C_6H_5$)— or

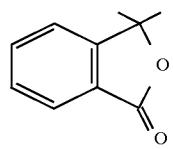

when

is the divalent benzene group, and X is O, S, —$CH_2$—, or —C($CH_3$)$_2$— when

is the divalent cyclohexane group; and from 5% to 70% by weight, based on the total weight of the polymerizable organic composition, of a second monomer component represented by the following general formula III,

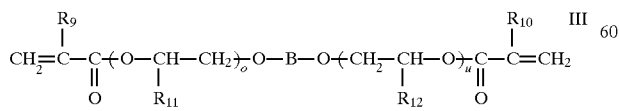

(III)

wherein o and u are each a positive number, the sum of o and u being from 25 to 70, preferably from 25 to 35, e.g., 30, $R_9$ and $R_{10}$ are each hydrogen or methyl, $R_{11}$ and $R_{12}$ are each hydrogen or $C_1$ to $C_2$ alkyl, and B is a divalent linking group selected from the group consisting of straight or branched chain alkylene (usually containing from 1 to 8 carbon atoms), phenylene, $C_1$–$C_9$ alkyl substituted phenylene, and a group represented by the following general formula IV,

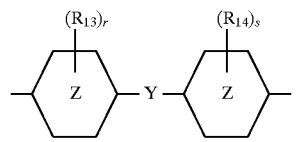

(IV)

wherein, $R_{13}$ and $R_{14}$ are each $C_1$–$C_4$ alkyl, chlorine or bromine, r and s are each an integer from 0 to 4,

represents a divalent benzene group or a divalent cyclohexane group and Y is O, S, —S($O_2$)—, —C(O)—, —$CH_2$—, —CH=CH—, —C($CH_3$)$_2$—, —C($CH_3$) ($C_6H_5$)— or,

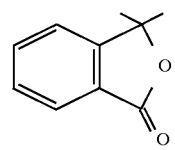

when

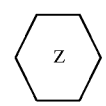

is the divalent benzene group, and Y is O, S, —$CH_2$—, or —C($CH_3$)$_2$— when

is the divalent cyclohexane group.

Polymerizable organic compositions according to the present invention may also contain from 0% to 65% by weight, based on the total weight of monomer components, of at least one monomer component selected from the following: (i) a monomer having a single ethylenically unsaturated group that is polymerizable by free radical initiation; (ii) a bis[(meth)acryloyl-terminated]polyethylene glycol monomer which is different than the first and second monomer components, the polyethylene glycol precursor from which monomer (ii) is derived has a number average molecular weight of from 200 to 2000 grams/mole; (iii) a poly(ethylenically-terminated) monomer having the following general formula V,

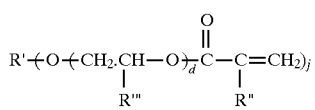

(V)

wherein R' is a radical derived from a polyol, R" is hydrogen or methyl, preferably methyl, R'" is hydrogen or $C_1$ to $C_2$ alkyl, preferably hydrogen or methyl, more preferably hydrogen, d is a number from 0 to 20, preferably 0 to 10, and j is a whole number from 3 to 6, preferably 3 to 4, and more preferably 3; and mixtures of monomers (i), (ii) and (iii).

As used herein with regard to d, e and f, m and n, and o and u, unless otherwise stated, "number" is meant to mean "average number". Other than in the operating examples, or where otherwise indicated, all numbers expressing quantities of ingredients or reaction conditions used herein are to be understood as modified in all instances by the term "about".

DETAILED DESCRIPTION OF THE INVENTION

In accordance with the present invention, there are provided certain polymerizable organic compositions containing a first monomer component, as defined above with respect to general formula I. The first monomer component is present in an amount preferably from 35% to 90%, and more preferably from 50% to 90% by weight, based on the total weight of the polymerizable organic composition.

A particularly preferred first monomer component can be defined with reference to general formula I, wherein, $R_3$ and $R_4$ are each methyl, $R_5$ and $R_6$ are each hydrogen, and A is a divalent linking group according to general formula II wherein

represents a divalent benzene group, p and q are each O, and X is —$C(CH_3)_2$—.

The polymerizable organic composition of the present invention contains also a second monomer component as defined with reference to general formula III. The second monomer component is present in an amount preferably from 5% to 60%, and more preferably from 10% to 50% by weight, based on the total weight of the polymerizable organic composition.

A particularly preferred second monomer component can be defined with reference to general formula III, wherein, $R_9$ and $R_{10}$ are each methyl, $R_{11}$ and $R_{12}$ are each hydrogen, and B is a divalent linking group according to general formula IV wherein

represents a divalent benzene group, the sum of o and u is from 25 to 35, e.g., 30, r and s are each 0, and Y is —$C(CH_3)_2$—.

The first and second monomer components may be prepared by methods which are well known in the art. One such commonly used method involves a two-step process. In the first step, a polyol, e.g., 4,4'-isopropylidenediphenol, is reacted with an oxirane containing substance, for example ethylene oxide, propylene oxide, α-butylene oxide or β-butylene oxide to form what is commonly referred to as an ethoxylated, propoxylated or butoxylated polyol having hydroxy functionality. The level of alkoxylation can be controlled depending on the amount of oxirane containing substance used in the reaction, e.g., an average of either 1 to 4 alkoxy units or 25 to 70 alkoxy units. In the second step, the ethoxylated, propoxylated or butoxylated polyol is esterified, or transesterified, with an alpha-beta unsaturated acid or ester such as methacrylic acid, an alkyl methacrylate, an acrylic acid, an alkyl acrylate, or a combination thereof. The second step results in the formation of the first or second monomer components.

Examples of polyols suitable for use in the first step of preparing the first and second monomer components include: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, 4-hydroxybenzyl alcohol, and 3,5-bis(1,1-dimethylethyl)-4-hydroxy-benzenemethanol; dihydroxybiphenyls such as 4,4'-dihydroxybiphenyl and 2,2'dihydroxybiphenyl; bisphenols such as 4,4'-isopropylidenediphenol; 4,4'-oxybisphenol; 4,4'-dihydroxybenzenephenone; 4,4,'-thiobisphenol; phenolphthlalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidenebiscyclohexanol; 4,4'-oxybiscyclohexanol; 4,4'-thiobiscyclohexanol; and bis(4-hydroxycyclohexanol)methane.

The polymerizable organic composition of the present invention may optionally contain from 0% to 65% by weight, based on the total weight of monomer components, of at least one monomer component selected from monomers (i), (ii), or (iii) as described above. Monomer (i) is described as having a single ethylenically unsaturated group which is polymerizable by free radical initiation. As used herein "ethylenically unsaturated" is meant to include allylic unsaturation, alpha-beta ethylenic unsaturation, and vinyl unsaturation. Monomer (i) may be present in an amount of from 0% to 40%, and preferably from 0% to 25% by weight, based on the total weight of monomer components.

The ethylenically unsaturated group of monomer (i) is preferably an alpha-beta ethylenic unsaturated group, e.g., methacrylate or acrylate. Examples of suitable monomers which may be used as monomer (i) include: acrylic acid, methacrylic acid, esters of acrylic acid such as methyl acrylate and 2-hydroxyethyl acrylate, esters of methacrylic acid, such as methyl methacrylate, phenoxyethyl methacrylate, isobornyl methacrylate, cyclohexyl methacrylate and 2-hydroxyethyl methacrylate, vinyl esters such as vinyl acetate, and styrene. A particularly preferred third monomer component is phenoxyethyl methacrylate.

Monomer (ii) is a bis[(meth)acryloyl-terminated] polyethylene glycol monomer which is different than the first and second monomer components. Monomer (ii) is derived from a polyethylene glycol precursor. The polyethylene glycol precursor form which monomer (ii) is derived has a number average molecular weight, as determined by gel permeation chromatography using a polystyrene standard, of preferably from 200 to 1200 grams/mole and more preferably from 400 to 700 grams/mole. Monomer (ii) may be present in an amount of from 0% to 50%, and preferably from 0% to 30% by weight, based on the total weight of monomer components. A particularly preferred bis[(meth)acryloyl-terminated]polyethylene glycol monomer is polyethylene glycol dimethacrylate that is derived from a polyethylene glycol precursor having a number average molecular weight of 600 grams/mole.

Monomer (iii), which is defined with reference to general formula V, may be present in an amount of from 0% to 50% and preferably from 0% to 30% by weight, based on the total weight of monomer components. A particularly preferred monomer (iii) can be defined with reference to general formula V wherein the polyol from which R' is derived is trimethylolpropane, R" is methyl, R'" is hydrogen, d is from 0 to 9, and j is 3.

Monomer (iii) may be prepared by methods well known in the art. One such commonly used method involves a two step process. In the first step, a polyol, e.g., trimethylolpropane, is reacted with an oxirane containing substance, for example ethylene oxide, propylene oxide, α-butylene oxide or β-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, an alkyl methacrylate, an acrylic acid, an alkyl acrylate, or a combination thereof. The second step results in the formation of monomer (iii).

Examples of polyols suitable for use in the first step of preparing monomer (iii) include: glycerine, trimethylolpropane, pentaerythritol, dipentaerythritol, di-trimethylolpropane and tris(2-hydroxyethyl) isocyanurate. A particularly preferred polyol is trimethylolpropane.

In a preferred embodiment of the present invention, the polymerizable organic composition is composed of from 40% to 95% by weight of the first monomer component and from 5% to 60% by weight of the second monomer component, both as described above. Further embodiments of the present invention include the following polymerizable organic compositions: 40% to 90% by weight of the first monomer component, 5% to 55% by weight of the second monomer component and 5% to 40% by weight of phenoxyethyl methacrylate; 30% to 90% by weight of the first monomer component, 5% to 65% by weight of the second monomer component and 5% to 65% by weight of the monomer (ii); and 30% to 90% by weight of the first monomer component, 5% to 65% by weight of the second monomer component and 5% to 65% by weight of the monomer (iii), based on the total weight of monomer components. All monomers are as described above.

Polymerization of the polymerizable organic composition of the present invention may be accomplished by adding to the composition an initiating amount of material capable of generating free radicals, such as organic peroxy compounds or azobis(organonitrile) compounds, i.e., an initiator. Methods for polymerizing compositions comprised of monomers, having ethylenically unsaturated groups which are radically polymerizable, are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate. A preferred thermal initiator is diisopropyl peroxydicarbonate.

Examples of suitable azobis(organonitrile) compounds, that may be used as thermal polymerization initiators include: azobis(isobutyronitrile) and azobis(2,4-dimethylvaleronitrile).

The amount of thermal polymerization initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred peroxy compound, diisopropyl peroxydicarbonate, typically between 0.01 and 3.0 parts of that initiator per 100 parts of the polymerizable organic composition (phm) may be used. More usually, between 0.05 and 1.0 phm is used to initiate the polymerization. Typically, the thermal cure cycle involves heating the polymerizable organic composition in the presence of the initiator from room temperature to 85° C. to 125° C. over a period of from 2 hours to 30 hours.

Photopolymerization of the polymerizable organic composition according to the present invention may be carried out in the presence of a photopolymerization initiator using ultraviolet light, visible light, or a combination thereof. Examples of suitable photopolymerization initiators include benzoin, benzoin methyl ether, benzoin isobutyl ether benzophenol, acetophenone, 4,4,'-dichlorobenzophenone, diethoxyacetophenone, 2-hydroxy-2-methyl-1-phenylpropan-1-one, 1-hydroxycyclohexyl phenyl ketone, 2-isopropylthixantone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. The photopolymerization initiator is typically used in an amount from 0.01% to 2% by weight, based on the weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically. Optionally a thermal post-cure, in the presence or absence of a thermal initiator, may be used in combination with photopolymerization of polymerizable organic compositions of the present invention The amount of thermal polymerization initiator or photopolymerization initiator, and the consequent cure cycle should be adequate to produce a polymerizate according to the present invention having a 0 second Barcol hardness of at least 1, preferably, at least 4, e.g., from 4 to 35.

Various conventional additives may be incorporated with the polymerizable organic composition of the present invention. Such additives may include light stabilizers, heat stabilizers, antioxidants, ultraviolet light absorbers, mold release agents, static (non-photochromic) dyes, pigments, polymerization inhibitors to promote stability during storage, and ultraviolet light absorbers (other than the photochromic compounds). In addition, it is contemplated that a form of organic photochromic substance resistant to the effects of the initiator may also be added to the polymerizable organic composition of the present invention. Such organic photochromic substances include photochromic pigments and photochromic compounds encapsulated in metal oxides, the latter of which are described in U.S. Pat. Nos. 4,166,043 and 4,367,170.

Antiyellowing additives, e.g., organo pyrocarbonates and triphenyl phosphite [CAS 101-02-0], may also be added to polymerizable organic compositions of the present invention to enhance resistance to yellowing. When used, the amount of antiyellowing additive present in the polymerizable organic composition of the present invention may vary. Only that amount which is sufficient to further enhance the resistance to yellowing from externally applied heat to polymerizates prepared from such compositions is required. Such amount may be referred to as a heat-stabilizing amount. The antiyellowing additive is incorporated into the polymerizable organic composition of the present invention by admixing the selected amount with agitation until the antiyellowing additive is dissolved in the composition. When used, the antiyellowing additive is typically present in an amount of from 0.05 to 1.0 percent by weight of the polymerizable organic composition, preferably from 0.05 to 0.5 weight percent and more preferably from 0.1 to 0.3 weight percent.

Organo pyrocarbonates that are useful include dialkyl pyrocarbonates, dicycloalkyl pyrocarbonates and bis(cycloalkylalkyl) pyrocarbonates. Suitable examples of dialkyl pyrocarbonates that may be used include: dimethyl pyrocarbonate [CAS 4525-33-1], diethyl pyrocarbonate [CAS 1609-47-8], diisopropyl pyrocarbonate, di-n-propyl pyrocarbonate, di-n-butyl pyrocarbonate, di-isobutyl pyrocarbonate, di-secondary-butyl pyrocarbonate, di-tertiary-butyl pyrocarbonate [CAS 24424-99-5], diamyl pyrocarbonate, di-tertiary-amyl pyrocarbonate [CAS 68835-89-2], dihexyl pyrocarbonate, diheptyl pyrocarbonate, di-2-ethylhexyl pyrocarbonate, dinonyl pyrocarbonate, didecyl pyrocarbonate and didodecyl pyrocarbonate. Examples of dicycloalkyl pyrocarbonates include dicyclohexyl pyrocarbonate and dicyclooctyl pyrocarbonate. An example of a bis(cycloalkylalkyl) pyrocarbonate is di-4-tertiary-butylcyclohexyl pyrocarbonate.

It is also contemplated that a polymerization moderator, or mixtures of polymerization moderators, may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, 1,3-diisopropenylbenzene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable organic composition of the present invention in an amount from 0.01% to 20% by weight, preferably from 0.1% to 10% by weight, and more preferably from 0.3% to 6% by weight, based on the total weight of polymerizable organic composition.

It is further contemplated that a flexibilizing additive having no free radical polymerizable groups, henceforth referred to as a nonpolymerizable flexibilizing additive, may be added to polymerizable organic compositions of the present invention. The nonpolymerizable flexibilizing additive, or mixtures of nonpolymerizable flexibilizing additives, may be added in an amount of from 0.05% to 15%, preferably from 0.5% to 12% and more preferably from 2% to 10% by weight, based on the total weight of the monomer components and the weight of the nonpolymerizable flexibilizing additive(s). The nonpolymerizable flexibilizing additive may be nonaromatic or aromatic.

Examples of suitable nonpolymerizable flexibilizing additives include, alkoxylated phenol benzoate, alkoxylated naphthol benzoate, 1,3-bis(phenylthio)propane, bis(phenylthio) alkylene ether, the reaction product of phenyl chloroformate and dimercaptan, the reaction product of dimercaptan and phosgene endcapped with phenol, cinnamates, triphenyl phosphite, tri(2-ethylhexyl) trimellitate, triisodecyl trimellitate, poly(alkylene glycol) dinaphthoate, 2-ethylhexyl diphenylphosphate, isodecyl diphenyl phosphate, tricresyl phosphate, poly(alkylene glycol) dibenzoates, e.g., poly(ethylene glycol) dibenzoate and poly(propylene glycol) dibenzoate, esters of phthalic acid, isophthalic acid, and terephthalic acid, e.g., dioctyl phthalate, and a member represented by the following general formula VI:

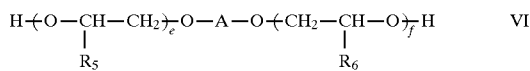

wherein e and f are each a positive number, the sum of e and f being from 0 to 70, $R_5$ and $R_6$ are each hydrogen or $C_1$ to $C_2$ alkyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by general formula II,

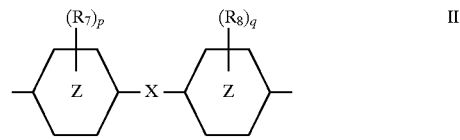

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —C(CH$_3$)$_2$—, —C(CH$_3$) (C$_6$H$_5$)— or

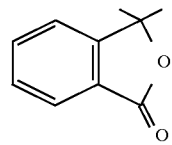

when

is the divalent benzene group, and X is O, S, —CH$_2$—, or —C(CH$_3$)$_2$— when

is the divalent cyclohexane group.

Nonpolymerizable flexibilizing additives, described with reference to general formula VI where the sum of e and f is greater than 0, may be prepared by methods which are well known in the art. One such commonly used method involves reacting a polyol, e.g., 4,4'-isopropylidenediphenol with an oxirane containing substance, e.g., ethylene oxide, propylene oxide, α-butylene oxide or β-butylene oxide to form the nonpolymerizable flexibilizing additive represented by general formula VI.

Examples of suitable polyols, for preparing nonpolymerizable flexibilizing additives represented by general formula VI wherein the sum of e and f is greater than 0, or for use as the nonpolymerizable flexibilizing additive wherein the sum of e and f is 0, include those described with respect to the first step of preparing the first and second monomer components, exclusive of 4,4'-(1,2-ethenediyl)bisphenol.

A preferred nonpolymerizable flexibilizing additive may be defined with reference to general formula VI wherein the sum of e and f is from 25 to 35, e.g., 30, R$_5$ and R$_6$ are each hydrogen, and A is a divalent linking group according to general formula II, wherein

represents a divalent benzene group, p and q are each 0 and X is —C(CH$_3$)$_2$—.

A particularly preferred nonpolymerizable flexibilizing additive which may be used in the practice of the present invention is a dibenzoate of poly(ethylene glycol), the poly(ethylene glycol) precursor of which has a number average molecular weight of from 100 to 1000 grams/mole.

Polymerizates obtained from polymerization of polymerizable organic compositions of the present invention will be solid and preferably transparent or optically clear so that they may be used for optical lenses, such as plano and ophthalmic lenses, sun lenses, window, automotive transparencies, e.g., windshields, T-roofs, sidelights and backlights, and for aircraft transparencies, etc. When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form.

Photochromic compounds that may be utilized with the polymerizable organic compositions or polymerizates of the present invention are organic photochromic compounds or substances containing same. These photochromic compounds may be added to such compositions prior to curing. Also, these photochromic compounds may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, blueish-green, or blueish-purple color when exposed to ultraviolet light in an appropriate solvent or matrix. Many of such compounds are described in the open literature. For example, spiro (indoline)naphthoxazines have been described, among others, in U.S. Pat. Nos. 3,562,172; 3,578,602; 4,215,010; and 4,342,668. Spiro(indoline)naphthoxazines having certain substituents at the 8' and 9' positions of the naphthoxazine portion of the molecule are described in U.S. Pat. No. 5,405,958. Spiro(indoline)pyridobenzoxazines are described in U.S. Pat. No. 4,637,698. Spiro(benzindoline) pyridobenzoxazines and spiro(benzindoline)naphthoxazines are described in U.S. Pat. No. 4,931,219. Spiro (benzindoline)naphthopyrans are described in Japanese Patent Publication 62/195383. Spiro(indoline)benzoxazines are described in U.S. Pat. No. 4,816,584. Spiro(indoline) benzopyrans, spiro(indoline)naphthopyrans and spiro (indoline)quinopyrans are described, for example, in U.S. Pat. No. 4,880,667. Benzopyrans and naphthopyrans having a nitrogen-containing substituent at the 2-position of the pyran ring are described in U.S. Pat. No. 4,818,096. Spiro (indoline)pyrans are also described in the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates which are described in, for example, U.S. Pat. No. 3,361, 706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic compounds in the aforedescribed patents are incorporated herein, in toto, by reference. The photochromic articles of the present invention may contain one photochromic compound or a mixture of photochromic compounds, as desired. Mixtures of photochromic compounds may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic compounds. The relative amounts of the aforesaid photochromic compounds used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

The present invention is more particularly described in the following examples, which are intended as illustrative only, since numerous modifications and variations therein will be apparent to those skilled in the art. Unless otherwise specified, all parts and percentages are by weight.

EXAMPLES 1–2

Table 1 describes two polymerizable monomer compositions. Example 2 is representative of an embodiment of the present invention, while Example 1 is a comparative example.

TABLE 1

|  | Example 1 | Example 2 |
|---|---|---|
| Basic Ingredients, Parts |  |  |
| BPA-2EO-DMA monomer[a] | 100 | 60 |
| SR-9036 monomer[b] | 0 | 40 |
| Triphenyl phosphite | 0.3 | 0.3 |
| Diethyl pyrocarbonate | 0.3 | 0.3 |
| Darocure 1173 photoinitiator[c] | 0.1 | 0.1 |
| tertiary—butylperoxy 2-ethylhexyl carbonate | 0.25 | 0.25 |

[a]BPA-2EO-DMA monomer was obtained from PPG Industries Inc. and is a bismethacrylate of ethoxylated 4,4'-isopropylidenediphenol having an average of 2 moles of ethylene oxide.
[b]SR-9036 monomer, obtained from Sartomer Inc., is a bismethacrylate of ethoxylated 4,4'-isopropylidenediphenol having an average of 30 moles of ethylene oxide.
[c]Darocure 1173 photoinitiator, available from Ciba-Geigy, is 2-hydroxy-2-methyl-1-phenylpropan-1-one.

Cast sheets of the polymerizable monomer compositions of Table 1 were made in the following manner. Each monomer composition was transferred to a suitable vessel and the designated amounts of Darocure 1173 photoinitiator and tertiary-butylperoxy 2-ethylhexyl carbonate were added. The resulting initiated polymerizable monomer composition was mixed using a magnetic stir plate and magnetic stir bar at ambient temperature. The initiated monomer composition was then filtered through a 0.45 micron MAGNA nylon filter using a 316 stainless steel 1.5 liter pressure filter holder, under 20 pounds per square inch (138 kPa) of nitrogen gas. The resulting filtered composition was degassed at 125 Torr, and then poured into glass molds that were transparent to UV radiation above 310 nanometers, and had interior dimensions of 15.24×15.24×0.32 cm. The filled molds were then passed three times through a UV irradiation device obtained from LESCO Incorporated which was equipped with a Fusion UV Curing Systems F-300 microwave powered D-bulb, having a peak power of 1 Watt/cm$^2$, and emitting 64% of its energy between 300 and 400 nm. A line speed of 91 cm/minute was used, and the molds were subjected to 5.7 J/cm$^2$ of UV light per pass through the UV irradiation device. The irradiated molds were then subjected to a thermal post-cure cycle as described in Table 2. Physical properties of the sheets were measured and the results are tabulated in Table 3.

TABLE 2*

Thermal Post-Cure Cycle
Thermal Post-Cure Cycle For Examples 1–2

| Cumulative Hours | Oven Temperature °C. |
|---|---|
| 0 | 70 |
| 1 | 125 |
| 2 | 125 |
| 3 | 80 |
|  | (end of cycle) |

*The rate of temperature change represented in Table 2 was, in all instances, linear.

TABLE 3

Physical Data

| Physical Test | Example 1 | Example 2 |
|---|---|---|
| Heat Distortion Temperature[d] (°C. at 10 mils) | ND[1] | 56 |
| Total Deflection at 130° C.[e] (mils) | ND[1] | 34 |
| Barcol Hardness (0 Seconds)[f] | 50 | 5 |
| Barcol Hardness (15 seconds)[f] | 48 | 0 |
| Fischer Microhardness, (N/mm$^2$)[g] | 193 | 71 |
| Refractive Index, ($n_d^{20}$)[h] | 1.565 | 1.547 |
| Abbe Number | 35 | 38 |
| % Transmittance[i] | 92.0 | 92.6 |
| Yellowness Index[j] | 2.9 | 1.6 |
| Density at 25° C. (g/cc) | 1.20 | 1.20 |
| Young's Modulus (GPa)[k] | 4.02 | 1.52 |
| Bayer Abrasion Resistance[l] | 0.7 | 1.6 |

[1]ND = Not Determined.
[d]The Heat Distortion Temperature was measured, at a deflection of 254 microns (10 mils), in accordance with ASTM D 648-86 using a Custom Scientific Instruments Model HDV3 DTUL/Vicat Softening Point Apparatus.
[e]Total Deflection at 130° C. was determined in accordance with ASTM D 648-86 using a Custom Scientific Instruments Model HDV3 DTUL/Vicat Softening Point Apparatus.
[f]Barcol Hardness was determined in accordance with ASTM - D 2583-81, taking scale readings immediately after the Barcol impresser point penetrated the specimen, and 15 seconds thereafter.
[g]Fischer Microhardness (N/mm$^2$) was determined, using a Fischer Scope H-100 instrument, in accordance with the instrument manufacture's instructions.
[h]Refractive Index $n_d^{20}$ was determined in accordance with ASTM D542-50, using a Bausch & Lomb Abbe-3L refractometer.
[i]Percent transmittance was determined in accordance with ASTM D 1003, using a Hunter Lab model Color Quest 2 colorimeter employing a Lumen C light source.
[j]Yellowness Index was determined in accordance with ASTM D 1925-70, using a Hunter Lab model Color Quest 2 colorimeter employing a Lumen C light source.
[k]Young's Modulus (GPa) was determined, using a Fischer Scope H-100 instrument, in accordance with the instrument manufacture's instructions. Smaller Young's Modulus values indicate improved flexibility.
[l]Bayer Abrasion Resistance was determined in accordance with ASTM F735-81, using an oscillating sand abrasion device. The Bayer Abrasion Resistance results are shown as ratios relative to homopolymers of CR-39 ® monomer as the standard, (result for the sample in question/result for standard). A Bayer Abrasion Resistance value greater than 1.0 indicates that the sample in question has better abrasion resistance relative to a sample prepared from the standard.

The data of Table 3 shows that polymerizates obtained from polymerizable monomer compositions of the current invention have enhanced flexibility, and Bayer Abrasion Resistance relative to polymerizates prepared from homopolymers of BPA-2EO-DMA monomer.

EXAMPLES 3–4

Sheets, 0.32 cm thick, were cast from polymerizable monomer compositions having the same compositions as described in Table 1 using glass molds having interior dimensions of 15.24×15.24×0.32 cm, the preparative and UV irradiation methods described in the previous Examples, and the thermal post-cure cycle described in Table 2. The cast sheets were cut into 40 mm×40 mm×0.32 cm test squares which were then imbibed with 3,3-di(4-methoxyphenyl)-13-hydroxy-13-(1-methylethyl)-indeno[2,1-f]naphtho[1,2-b]pyran as follows: Resin solutions of the photochromic substance were spin coated onto one side of each test square. The coated test squares were then allowed to dry under an infrared lamp for 20 minutes followed by heating for 4.5 hours in a forced air oven set at 135° C. The imbibed test squares were then removed from the oven and allowed to cool to room temperature. The imbibed test squares were then thoroughly washed with 32° C. water, followed by wiping with acetone, to remove the resin solution.

Photochromic performance data for the imbibed test squares were determined through use of an optical bench. Prior to testing on the optical bench, the imbibed test squares were exposed to 365 nanometer ultraviolet light for about 15 minutes to activate the photochromic compounds and then placed into a 76° C. oven for about 15 minutes to bleach or inactivate the photochromic compounds. The imbibed test squares were then cooled to room temperature, exposed to fluorescent room lighting for at least 2 hours and then kept covered for at least 2 hours prior to testing on an optical bench maintained at 23.9° C.

The optical bench was equipped with a 300 watt Xenon arc lamp operated at about 280 watts, a remote controlled shutter, a 3 mm KG-2 cut off filter which removes short wavelength radiation, 1.33 neutral density filter(s) and a constant temperature water bath in which the test square was immersed. A collimated beam of light from a tungsten lamp was passed through the test square at a small angle to the normal of the surface of the test square. After passing through the test square, the light from the tungsten lamp impinged a beam splitter which split the beam into two secondary beams of equal intensity. The reflected secondary beam was directed through a 480 nm band pass filter to a detector. The unreflected secondary beam was directed through a 620 nm band pass photopic filter to a detector. The photopic filter passes wavelengths such that the detector mimics the response of the human eye. The output signals from the detector(s) were processed by a radiometer which delivered data to a computer. The following Table 4 lists photochromic performance data obtained from the test squares.

TABLE 4

Photochromic Performance

| | Example 3 | Example 4 |
|---|---|---|
| | Polymerizable Monomer Compositions According to Example | |
| Test | 1 | 2 |
| Net Absorbance[m] at 370 nm | 0.02 | 2.51 |
| ΔOD[n] 30 seconds, (29.4° C.) | ND[2] | 0.279 |
| ΔOD[n] 90 seconds, (29.4° C.) | ND[2] | 0.378 |
| ΔOD[n] 5 minutes, (29.4° C.) | ND[2] | 0.438 |
| ΔOD[n] 8 minutes, (29.4° C.) | ND[2] | 0.451 |
| Bleach Half Life ($t_{1/2}$)[o] (seconds) | ND[2] | 46 |

[2]ND = Not Determined. Test squares according to Example 3 could not be imbibed to any appreciable extent, as evidenced by the small value obtained for Net Absorbance at 370 nm, and as such additional photochromic performance data relative to Example 3 was not determined.
[m]Net Absorbance at 370 nm, (viz., absorbance of the imbibed test square in the bleached state minus the absorbance of the unimbibed test square) was determined at room temperature using a Varian Model Cary 3 spectrophotometer.

TABLE 4-continued

Photochromic Performance

| | Example | |
|---|---|---|
| | 3 | 4 |
| | Polymerizable Monomer Compositions According to Example | |
| Test | 1 | 2 | n Change in optical density (ΔOD) was determined on the optical bench by inserting an imbibed test square, in the bleached state, into the sample holder, adjusting the transmittance scale to 100%, opening the shutter from the Xenon lamp to provide ultraviolet radiation to change the test square from the bleached state to an activated (i.e., substantially darkened) state, measuring the transmittance in the activated state, and calculating the change in optical density according the formula ΔOD = log(100/% Ta) where % Ta is the percent transmittance in the activated state and the logarithm is to the base 10. The period of exposure to the ultraviolet light from the Xenon lamp at the time the percent transmittance is determined, and the temperature of the water bath, are both noted.
o The Bleach Half Life ($T_{1/2}$) is the time interval in seconds for the absorbance of the activated form of the imbibed lens to reach one half the highest absorbance at 29.4° C. after removal of the source of activating light.

The data of Table 4 shows that photochromic articles made from polymerizates of the present invention may be successfully imbibed with photochromic substances to produce articles that have good photochromic performance properties compared to polymerizates prepared from homopolymers of BPA-2EO-DMA monomer.

The present invention has been described with reference to specific details of particular embodiments thereof. It is not intended that such details be regarded as limitations upon the scope of the invention except insofar and as to the extent that they are included in the accompanying claims.

We claim:

1. A polymerizable organic composition consisting essentially of:

(a) from 30% to 95% by weight, based on the total weight of the polymerizable organic composition, of a first monomer component represented by the following general formula, $$CH_2=C(R_3)-C(=O)-(O-CH-CH_2)_m-O-A-$$
with $R_5$ on the CH

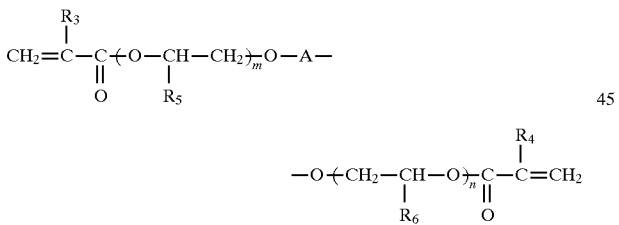

wherein m and n are each a positive number, the sum of m and n being from 1 to 4, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene, phenylene, $C_1$-$C_9$ alkyl substituted phenylene, and a group represented by the following general formula,

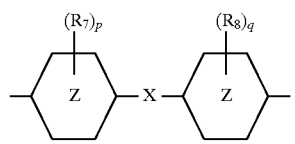

wherein $R_7$ and $R_8$ are each $C_1$-$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —CH=CH—, —C($CH_3$)$_2$—, —C($CH_3$) ($C_6H_5$)— or

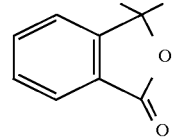

when

is the divalent benzene group, and X is O, S, —$CH_2$—, or —C($CH_3$)$_2$— when

is the divalent cyclohexane group;

(b) from 5% to 70% by weight, based on the total weight of the polymerizable organic composition, of a second monomer component represented by the following general formula,

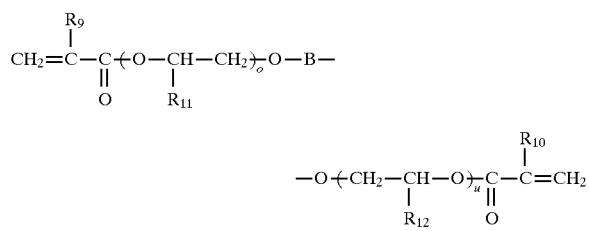

wherein o and u are each a positive number, the sum of o and u being from 25 to 70, $R_9$ and $R_{10}$ are each hydrogen or methyl, $R_{11}$, and $R_{12}$ are each hydrogen or $C_1$ to $C_2$ alkyl, and B is a divalent linking group selected from the group consisting of straight or branched chain alkylene, phenylene, $C_1$-$C_9$ alkyl substituted phenylene, and a group represented by the following general formula,

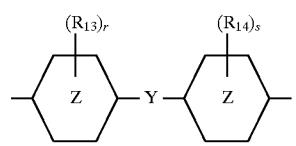

wherein, $R_{13}$ and $R_{14}$ are each $C_1$-$C_4$ alkyl, chlorine or bromine, r and s are each an integer from 0 to 4,

represents a divalent benzene group or a divalent cyclohexane group and Y is O, S, —S(O$_2$)—, —C(O)—, —CH$_2$—, —CH=CH—, —C(CH$_3$)$_2$—, —C(CH$_3$) (C$_6$H$_5$)— or

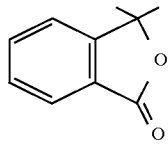

when,

is the divalent benzene group, and Y is O, S, —CH$_2$—, or —C(CH$_3$)$_2$— when

is the divalent cyclohexane group; and (c) from 0% to 65% by weight, based on the total weight of monomer components, of at least one monomer component selected from the group consisting of:
(i) a monoethylenically unsaturated monomer which is polymerizable by free radical initiation;
(ii) a bis[(meth)acryloyl-terminated]polyethylene glycol monomer, the polyethylene glycol precursor of said (c) (ii) monomer having a number average molecular weight of from 200 to 2000 grams/mole, said (c) (ii) monomer being different than said first and second monomer components; and
(iii) a poly(ethylenically-terminated) monomer having the following general formula,

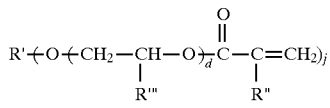

wherein R' is a radical derived from a polyol, R'' is hydrogen or methyl, R''' is hydrogen or C$_1$ to C$_2$ alkyl, d is a number from 0 to 20, and j is a whole number from 3 to 6.

2. The polymerizable organic composition of claim 1 wherein a polymerization moderator is also present in an amount of from 0.01% to 20% by weight, based on the total weight of monomer components.

3. The polymerizable organic composition of claim 2 wherein said polymerization moderator is selected from the group consisting of 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,3-diisopropenylbenzene and mixtures of such polymerization moderators.

4. The polymerizable organic composition of claim 1 wherein a nonpolymerizable flexibilizing additive is also present in an amount of from 0.05% to 15% by weight, based on the total weight of monomer components and said nonpolymerizable flexibilizing additive.

5. The polymerizable organic composition of claim 4 wherein the nonpolymerizable flexibilizing additive is selected from the group consisting of poly(alkylene glycol) dibenzoate, esters of phthalic acid, esters of isophthalic acid, esters of terephthalic acid, a member represented by the following general formula,

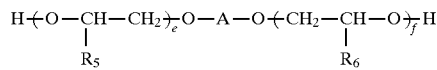

wherein e and f are each a positive number, the sum of e and f being from 0 to 70, R$_5$ and R$_6$ are each hydrogen or C$_1$ to C$_2$ alkyl, and A is a divalent linking group selected from the group consisting of straight or branched chain alkylene, phenylene, C$_1$–C$_9$ alkyl substituted phenylene and a group represented by the following general formula,

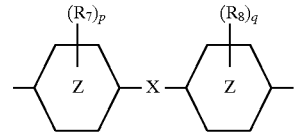

wherein, R$_7$ and R$_8$ are each C$_1$–C$_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —C(CH$_3$)$_2$—, —C(CH$_3$) (C$_6$H$_5$)— or

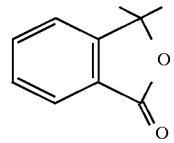

when

is the divalent benzene group, and X is O, S, —CH$_2$—, or —C(CH$_3$)$_2$— when

is the divalent cyclohexane group, and mixtures of said nonpolymerizable flexibilizing additives.

6. The polymerizable organic composition of claim 1 wherein A is a divalent linking group represented by the following general formula,

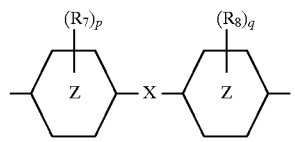

wherein

represents a benzene group; B is a divalent linking group represented by the following general formula,

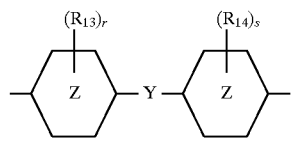

wherein

represents a benzene group; said (c) (i) monomer is an ester of acrylic acid, methacrylic acid or a mixture thereof; said (c)(ii) monomer is methacryloyl-terminated; and the polyol from which R' is derived is trimethylolpropane, pentaerythritol or dipentaerythritol.

7. The polymerizable organic composition of claim 6 wherein $R_3$, $R_4$, $R_9$ and $R_{10}$ are each methyl, $R_5$, $R_6$, $R_{11}$ and $R_{12}$ are each hydrogen, p, q, r and s are each O, X and Y are each —$C(CH_3)_2$—, the sum of o and u is from 25 to 35, said (c) (i) monomer is phenoxyethyl methacrylate, the polyethylene glycol precursor of said (c) (ii) monomer having a number average molecular weight of from 500 to 700 grams/mole, the polyol from which R' is derived is trimethylolpropane, R" is methyl, R'" is hydrogen, d is from 0 to 9, and j is 3.

8. The polymerizable organic composition of claim 7 wherein said first monomer component is present in an amount of from 40% to 95% by weight, and said second monomer component is present in an amount of from 5% to 60% by weight.

9. The polymerizate of claim 1.

10. The polymerizate of claim 7.

11. The polymerizate of claim 8.

12. A photochromic article comprising:
    (a) the polymerizate of claim 1; and
    (b) a photochromic amount of an organic photochromic substance.

13. A photochromic article comprising:
    (a) the polymerizate of claim 7; and
    (b) a photochromic amount of an organic photochromic substance.

14. The photochromic article of claim 13 wherein the organic photochromic substance is selected from the group consisting of spiro(indoline)naphthoxazines, spiro(indoline)benzoxazines, benzopyrans, naphthopyrans, chromenes, organo-metal dithizonates, fulgides and fulgimides and mixtures of such organic photochromic substances.

15. A photochromic article comprising:
    (a) the polymerizate of claim 8; and
    (b) a photochromic amount of an organic photochromic substance.

16. The polymerizable organic composition of claim 3 wherein the polymerization moderator is present in an amount of from 0.1 to 10 weight percent.

17. The polymerizable organic composition of claim 5 wherein the non-polymerizable flexibilizing additive is present in an amount of from 0.5 to 12 weight percent.

18. The polymerizable organic composition of claim 17 wherein $R_5$ and $R_6$ are each hydrogen, A is the group,

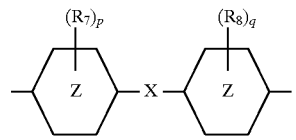

wherein p and q are zero, Z is divalent benzene, X is —$C(CH_3)_2$—, and e plus f is a number of from 25 to 35.

19. The polymerizable organic composition of claim 1 wherein the first monomer component is present in an amount of from 50 to 90 weight percent and the second monomer component is present in an amount of from 10 to 50 weight percent.

* * * * *